United States Patent
Over Behrens et al.

[11] Patent Number: 5,852,922
[45] Date of Patent: Dec. 29, 1998

[54] MACHINE FOR CUTTING AND CHOPPING CORN AND SIMILAR STALK-LIKE HARVESTED CROPS INDEPENDENTLY OF ROWS

[75] Inventors: Matthias Sievers Over Behrens, Coesfeld; Richard Wuebbels, Rhede; Leo Schulze Hockenbeck, Everswinkel, all of Germany

[73] Assignee: Maschinenfabrik Kemper GmbH & Co., KG, Stadtlohn, Germany

[21] Appl. No.: 914,951

[22] Filed: Aug. 20, 1997

[30] Foreign Application Priority Data

Aug. 22, 1996 [DE] Germany ............ 296-14-549.1

[51] Int. Cl.⁶ ............ A01D 34/04; A01D 45/00
[52] U.S. Cl. ............ 56/14.7; 56/102; 56/60; 56/157
[58] Field of Search ............ 56/60, 14.5, 94, 56/14.7, 102, 157

[56] References Cited

U.S. PATENT DOCUMENTS

| | | |
|---|---|---|
| 1,901,099 | 3/1933 | Hale ............ 56/102 |
| 5,150,565 | 9/1992 | Bich ............ 56/102 |
| 5,157,904 | 10/1992 | Otten et al. ............ 56/60 |
| 5,237,804 | 8/1993 | Bertling ............ 56/60 |
| 5,651,243 | 7/1997 | Arnold et al. ............ 56/102 |
| 5,722,225 | 3/1998 | Wuebbels et al. ............ 56/60 |

*Primary Examiner*—Thomas B. Will
*Assistant Examiner*—Arpad Fubian Kovacs
*Attorney, Agent, or Firm*—Jordan and Hamburg

[57] ABSTRACT

A machine for cutting and chopping corn and similar stalk-like harvested crops independently of rows includes drawing-in and cutting drums which are overlapped on the upper side in the region of their rotational sector by cover plates which interact each with a divider point for the harvested crops to be cut. The divider point extends in the driving direction. The outer edge of the cover plates in the region adjoining the respective divider point has an arching counter to the driving direction. The arching exposes the driving teeth of the associated drawing-in and cutting drum and forms an opening for the entry of the harvested crop between the driving teeth. This opening can optionally be closed by means of a blocking element depending on the nature of the crops being harvested.

20 Claims, 3 Drawing Sheets

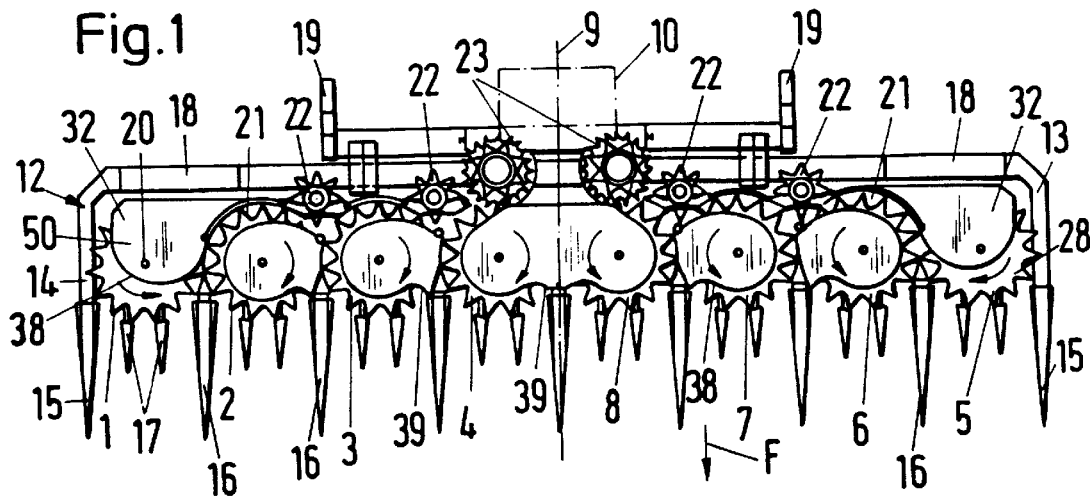
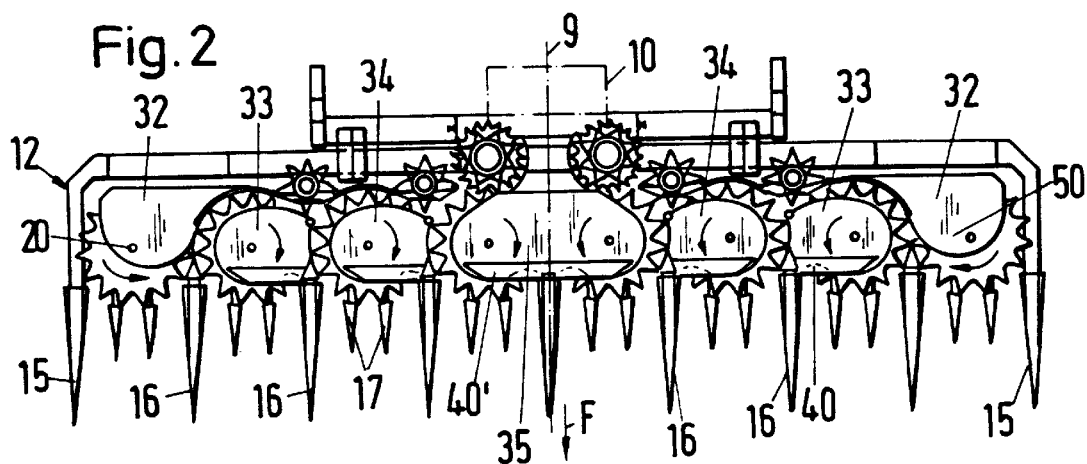
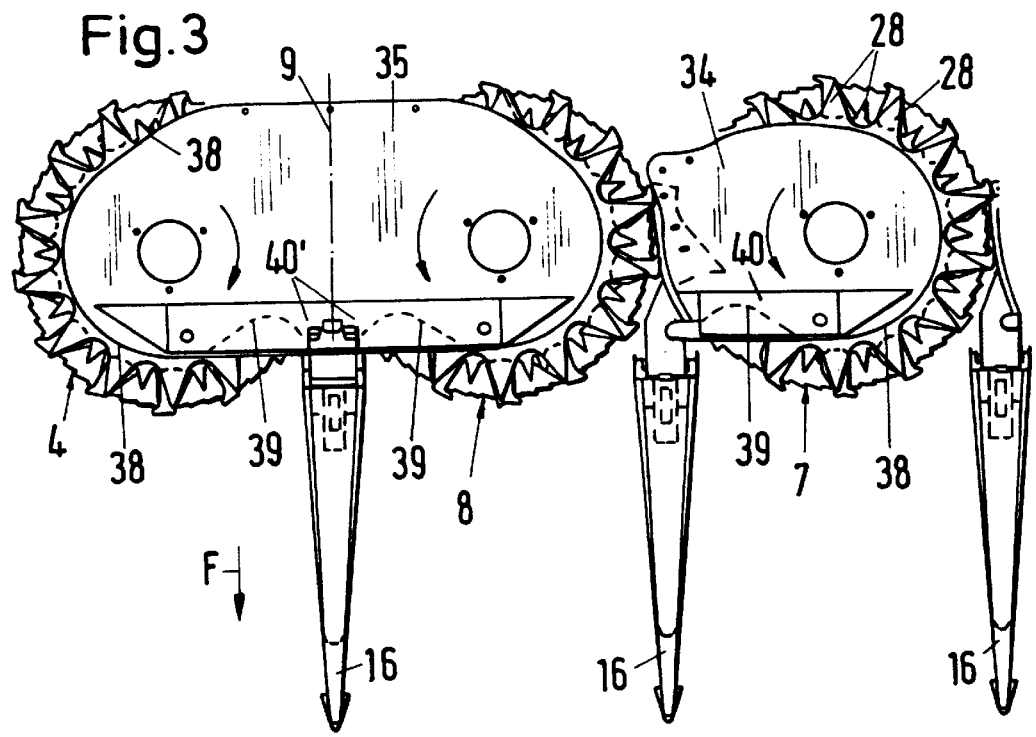

MACHINE FOR CUTTING AND CHOPPING CORN AND SIMILAR STALK-LIKE HARVESTED CROPS INDEPENDENTLY OF ROWS

BACKGROUND OF THE INVENTION

The invention relates to a machine for cutting and chopping corn and similar stalk-like harvested crops independently of rows.

In the case of such a known machine, which is frequently also referred to, in an abbreviated fashion, as corn cutter/chopper, the stalks of the harvested crop are pulled in an upright position and cut and subsequently supplied to the chopper over the insertion rollers that precede the chopper. By means of a plurality of drawing-in and cutting sites distributed over the front working area of the machine, a mode of operation of the drawing-in and cutting drums, independent of the distance between rows and the direction of the rows is achieved so that the machine can also be used for crops sown by broadcasting comparably to a combine harvester for grain. Moreover, with the help of the driving teeth, which are provided at the drawing-in and cutting drums, bent crops, such as wind-flattened corn, can also be taken up satisfactorily.

SUMMARY OF THE INVENTION

It is an object of the invention to provide a machine of the initially stated type which can be adapted to the different harvesting conditions of corn on the one hand and, on the other, to crops, such as different types of grain and grasses, which are to be taken to a whole-plant silage.

In the case of the inventive development of a machine for cutting and chopping corn and other whole-plant silage material independently of rows, an opening, exposing the drive teeth of the drawing-in and cutting drum in this region, is created by means of an arching in the outer edge of the respective cover plate. This opening especially enables crops other than corn, that is grain varieties and grasses, to penetrate through this opening between the driving teeth of the drawing-in and cutting drum. This proves to be advantageous for grain varieties and grasses intended for whole-plant silage, because these are cut in the green, unripe state for the silage, for which purpose a considerable mass of green material must be cut and conveyed by the driving teeth to the chopper. The inventive development prevents malfunctions here in the susceptible region of the, relative to the chopper, retrograde rotational sector of the drawing-in and cutting drums through the inlet opening for the harvested product, which is created close to the adjoining divider point and which enables the increased mass of green material to be taken hold of completely by the driving teeth of the drawing-in and cutting drums and passed by the drum, which continues to rotate, reliably to the insertion rollers of the chopper. For cutting corn, which is cut in the ripe state, this opening proves to be less advantageous for the course of the conveying. Therefore, pursuant to the invention, this opening is closed by means of a blocking element while the corn is being cut. The harvesting can in this manner be optimized as a function of the harvested crops. In a position, overlapping the arching, the blocking element can be connected in a simple manner with the cover plate. In particular, bolted connections, which can be produced easily and, in case of need, undone once again easily, come into consideration for this connection.

In a further development of the invention, the blocking element can be formed by a deflector for top-heavy harvested products, especially corn, and be placed on the cover plate. Such a deflector prevents the corncob breaking off or falling from the cover plate, so that corncob losses during the conveying of the cut corn plants to the chopper are practically precluded.

Advisably, the deflector has a rod-shaped basic configuration and can be fastened with its longitudinal axis at right angles to the driving direction on the upper side of the cover plate in the front edge region of the latter. The deflector can have any suitable configuration, for example, that of a circular or quadrilateral pipe; however, for harvesting operations, a wedge-shaped construction with a wedge back, inclined in the driving direction, has proven to be particularly advantageous.

In the description below, the invention is explained in greater detail with further distinguishing features and advantages by means of the drawings, in which an example of the object of the invention is shown diagrammatically.

IN THE DRAWINGS

FIG. 1 shows a plan view of what, in the driving direction, is the front region of the machine, with a total of eight drawing-in and cutting drums in a first method of operation, FIG. 2 shows a representation corresponding to that of FIG. 1, to illustrate a second method of operation of the machine, FIG. 3 shows a section of FIG. 2 on a scale larger than that of FIG. 2, FIG. 4 shows a section of FIG. 3 on an even larger scale, FIG. 5 shows a cross section through a divider point looking in the direction of an adjoining drawing-in and cutting drum, FIG. 6 shows a longitudinal section through a divider point looking in the direction of an adjoining drawing-in and cutting drum, and FIG. 7 shows a cross section through a wedge-shaped deflector, used in the second method of operating the machine.

DESCRIPTION OF THE PREFERRED EMBODIMENTS

Figure 4:
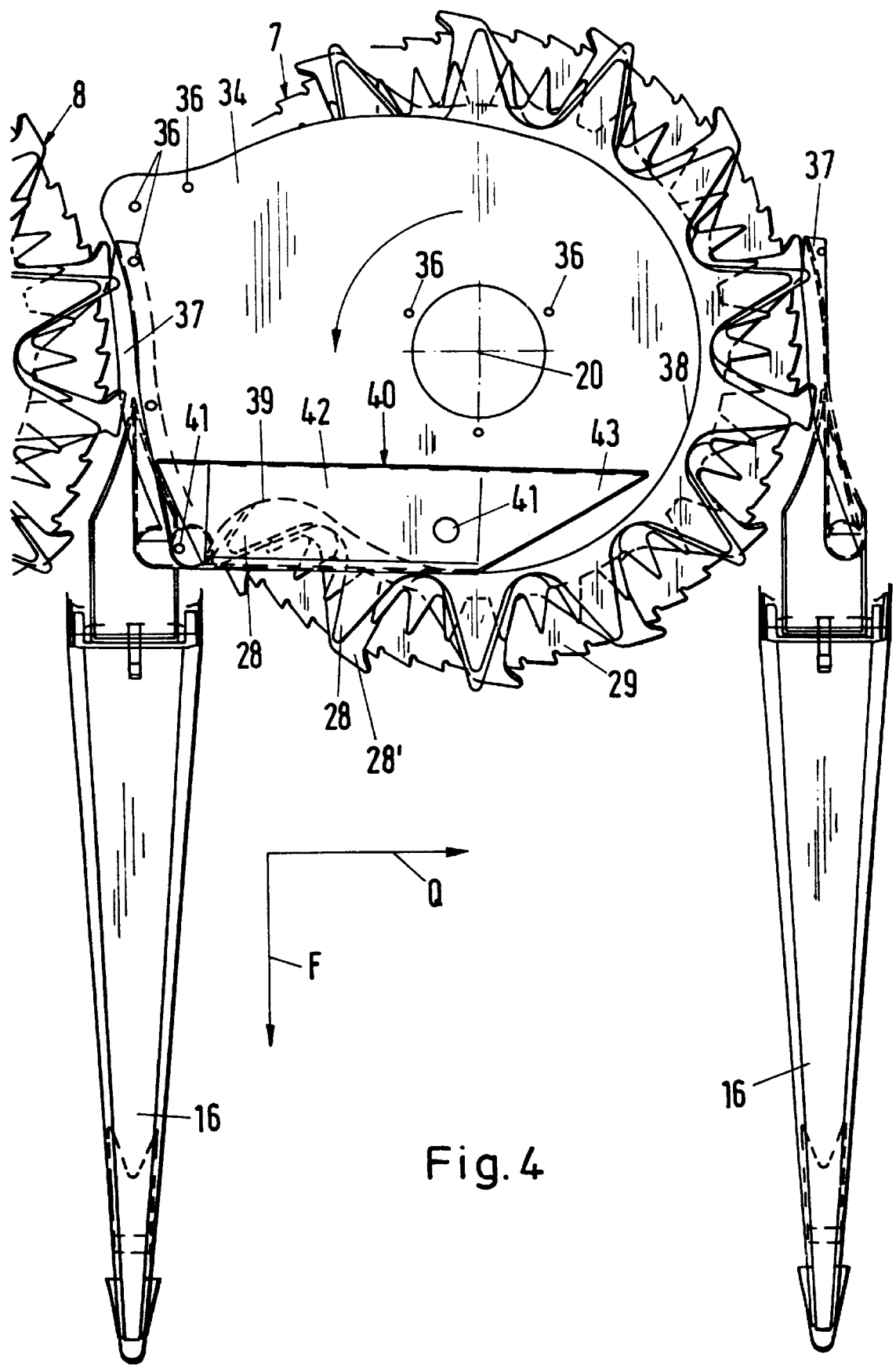

The machine of FIGS. 1 and 2, moved forwards in the working and driving direction indicated by arrow F, can be constructed, as in the case of the example shown, as an attachment for a tractor or also as a self-propelling vehicle and, in the example shown, comprises a total of eight drawing-in and cutting drums 1 to 8, of which the drawing-in and cutting drums 1 to 4 are disposed on one side and the drawing-in and cutting drums 5 to 8 are disposed on the other side of a vertical, longitudinal median plane 9, which forms a plane of symmetry for the machine to the extent shown. In the driving direction F, the drawing-in and cutting drums 1 to 8 are disposed ahead of the chopper 10, which are indicated by lines of dots and dashes and ahead of which the usual insertion rollers are disposed which define a horizontal inlet gap for the cut harvested crops.

The drawing-in and cutting drums 1 to 8 are surrounded at the side and at the rear by a machine frame 12 which is open at what is the front side in the driving direction. The machine frame 12 comprises lateral guides 13 and 14 which together determine the working width of the machine. At the front, the lateral guides 13 and 14 run out in each case into a divider point 15 which acts as leaf lifter for the harvested crops and prepares the reaping cut. Within the working width of the machine, in the region before the gusset between in each case two adjacent drawing-in and cutting drums 1 to 8, further divider points 16 are disposed, which are of the same length as the divider points 15. Two short divider points 17, which are at a distance from one another, are located in each case between the divider points 15, 16. The divider points 16 and 17 are fastened to the underside of the machine frame 12 in a manner, the details of which are not shown.

At the rear of the machine frame 12, in each case on either side of the vertical longitudinal median plane 9, a frame pipe 18 is fixed, which contains in each case a main driving element for the drawing-in and cutting drums 1 to 4 and 5 to 8 respectively. In each case, the motive power is received over a spur gearing 19 from a central power train of the chopper 10 and transferred to the respective main driving element in the frame pipe 18. From the main driving element, the individual drawing-in and cutting drums 1 to 8 are driven over miter gears so that they will rotate with the same rotational speed about a vertical or, at least, essentially vertical axis of rotation 20. Between the, in each case, adjacent divider points 15, 16, 17, in each case a drawing-in and cutting site for the crop stalks to be harvested is formed. The crops stalks to be harvested are then supplied from the drawing-in and cutting drums 1 to 8, the direction of rotation of which is made clear in each case by an arrow, through a conveying duct 21 on either side of the vertical longitudinal median plane 9 to the chopper 10.

In each gusset region between the drawing-in and cutting drums 2, 3 and 3, 4, as well as 6, 7 and 7, 8, a drum 22, for conveying the cut harvested crops transversely, is disposed. Just as the drawing-in and cutting drums 5 to 8, the drums 22 are provided with protruding driving teeth and, in turn, rotate about an essentially vertical axis. To bridge a vertical distance between the essentially horizontal cutting plane and the horizontal plane, defined by the insertion rollers of the chopper 10, a drum 23, which conveys obliquely and is provided in turn with protruding driving teeth, is disposed in each case in the example shown in the region between the transversely conveying drum 22, closest to the vertical longitudinal median plane 9, and the insertion rollers of the chopper 10. The obliquely conveying drums 23 have an arrangement and configuration for transferring the cut harvested crops from the outlet end of the conveying ducts 21 adjoining in each case the longitudinal median plane 9 and for feeding the harvested crops into the insertion gap between the insertion rollers of the chopper 10.

Figure 5:
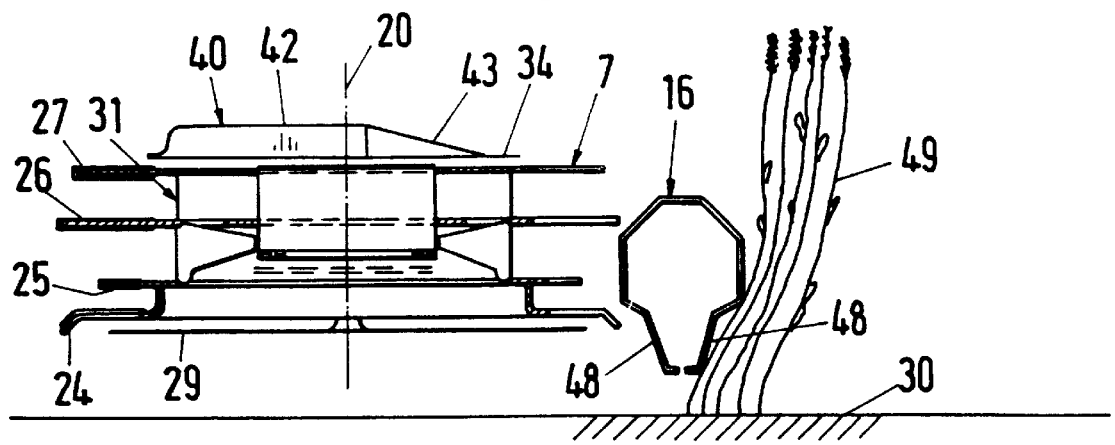
Figure 6:
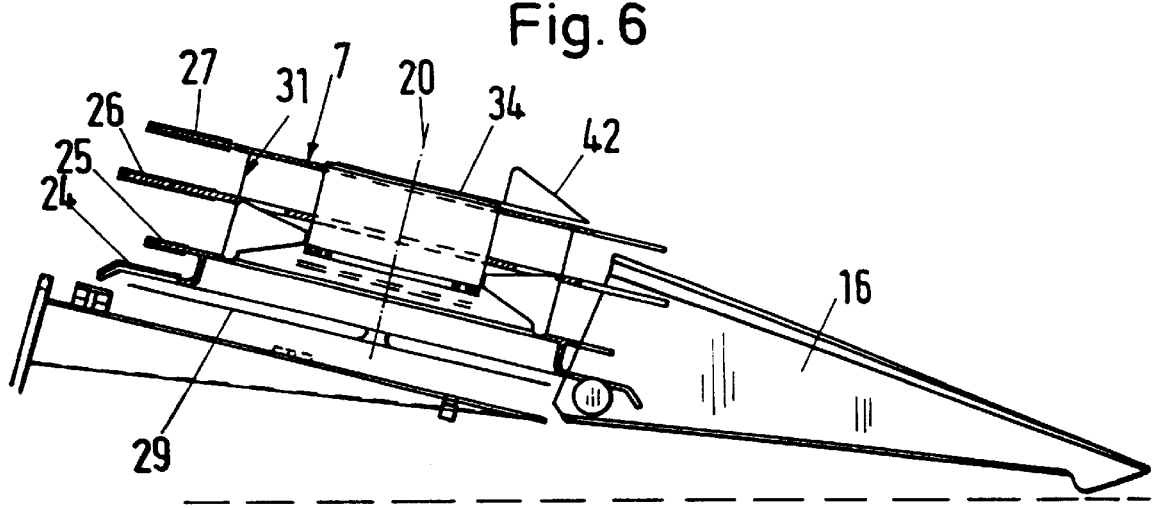

By means of the drawing-in and cutting drums 6 and 7 respectively, FIGS. 5 and 6 show the construction of the similarly constructed drawing-in and cutting drums 1 to 8 with four superimposed, vertically spaced apart rims 24 to 27 of driving teeth 28, of which the driving teeth 28 of the toothed rims 25 to 27 have the basic triangular shape with the outwardly directed triangular point shown in FIGS. 1 to 4, while the driving teeth 28' of the lower toothed rim 24 can have a downwardly angular, for example, trapezoidal shape, that is appropriate for interacting with the circular cutting knife 29, revolving directly below the toothed rim 24, for example, in the nature of a saw rotor. When the machine is being operated, the peripheral speed of the cutting knife 29 is significantly higher than that of the toothed rims 24 to 27, so that the stalks can be severed as if by a rotating mower in a free cut by the cutting knives 29 a short distance above the ground indicated at 30 in FIG. 5. The toothed rims 24 to 27, which rotate more slowly, are supported in a drum 31, which defines the cylindrical extent of the drawing-in and cutting drums 1 to 8 and, just as the cutting knives 29, derives it motive power from the respective main driving element in the frame pipe 18. The drum 31 and the cutting knife 29 rotate about the common axis of rotation 20.

On the upper side, the drawing-in and cutting drums 1 and 8 are overlapped in the region of what, with respect to the chopper 10, is the retrograde rotation sector by cover plates 32 to 35, which are fixed to the machine. As can be seen particularly in FIG. 4 in conjunction with the drawing-in and cutting drum 7, the cover plates 32 to 35 are connected at several fastening sites 36, which advisably are bolted connections, immovably to stationary parts of the drum 31 and the machine frame 12 or frame parts suitable for this purpose, for example, in the form of vertical reinforcing elements of the machine frame 12 or of dividers 37 like those, which are disposed in what, when viewed in the driving direction F, is in front of each transversely conveying drum 22 in the gap between the two, in each case adjacent drawing-in and cutting drums 2, 3 and 3, 4 or 6, 7 and 7, 8. The middle cover plate 35, which extends on both sides of the vertical longitudinal median plane 9 of the machine, is assigned jointly to the two drawing-in and cutting drums 4 and 8 and fastened in a manner, the details of which are not shown, at the two drums at stationary drum parts and at suitable parts of the machine frame 12.

In what is the front region of the drawing-in and cutting drum 2, 3, 4, or 6, 7, 8 when viewed in the driving direction F, the outer edge 38 of the cover plates 33, 34 and 35 is at a large distance from the dedendum circle of its driving teeth 28. This distance becomes smaller towards the rear end of the drawing-in and cutting drums 2, 3, 4 and 6, 7, 8 respectively to the height of the dedendum circle and tapers off tangentially to this circle. As a result, the inlet region of the drawing-in and cutting drums 2, 3, 4 and 6, 7, 8, that is the rotational sector, which is leading with respect to the chopper 10, is constructed aggressively and exerts a strong conveying action on the cut harvested crops, while the rear region, at the start of the retrograde rotational sector of the drawing-in and cutting drums 2, 3, 4 and 6, 7, 8 is covered, in order to counteract an undesirable backwards conveying of the harvested crops.

In a region, which adjoins the respective divider point 16 in the center of the machine and opposite the transversely conveying drums 22, the outer edge 38 of the cover plates 33, 34 and 35 is arched at 39 counter to the driving direction F. The arching 39 forms an opening, which exposes the driving teeth 28 of the associated drawing-in and cutting drum 2, 3, 4 and 6, 7, 8 so that, during the cutting operation, the harvested crops can enter here between the driving teeth 28. The arching 39 ends arc-shaped in the transition region between the moving component of the drawing-in and cutting drum 2, 3, 4 and 6, 7, 8, which is rotating in the given arrow direction and points in the driving direction F, that is, towards the front, and the moving component, which points at right angles thereto in the direction Q. This is shown particularly in FIG. 4. The openings, formed by the archings 39, are effective for harvesting whole plant silage material in the form of grains and grasses. This mode of operation is shown in FIG. 1.

As is evident from FIG. 5, the divider points 16 have a cross-sectional profile with lower side parts 48, tapering towards the lower end of the divider points 16. This construction contributes to improving the cutting, since the stalks 49 of the harvested products, as shown in FIG. 5, are deflected less laterally from their perpendicular position before the cutting process.

For harvesting corn and other top-heavy crops the opening, which exposes the driving teeth 28, is closed off by a blocking element in the form of a deflector 40 which, in a position overlapping the arching 39, is permanently connected with the associated cover plate 33, 34, 35. This mode of operation is shown in FIGS. 2 to 7.

The deflector 40 has a rod-shaped basic shape and, for the corn-harvesting mode of operation, is fastened with its longitudinal axis in the direction Q at right angles to the driving direction F on the upper side of the associated cover plate 33, 34, 35 in the front edge region of the latter, as is illustrated particularly in FIG. 4. The deflector 40 is fastened with bolts, as is illustrated diagrammatically in FIG. 4 at 41.

The deflector 40 is constructed wedge-shaped with a wedge back 42 inclined in the driving direction F. The wedge back 42 occupies a first wedge region with a wedge point, which points in the driving direction F and extends with its wedge width approximately from an imaginary extension of the adjoining side wall of the adjacent divider point 16 in the transverse direction Q up to a vertical plane, which contains the axis of rotation 20 and is parallel to the driving direction F and, at the same time, covers the arching 39. A second wedge region 43, the wedge point of which points in the direction Q and which has a triangular shape in plan view, adjoins the end of the wedge region 42 that is averted from the arching 39. At the same time, the free triangular point ends before the outer edge 38 of the associated cover plate 33, 34.

Figure 7:
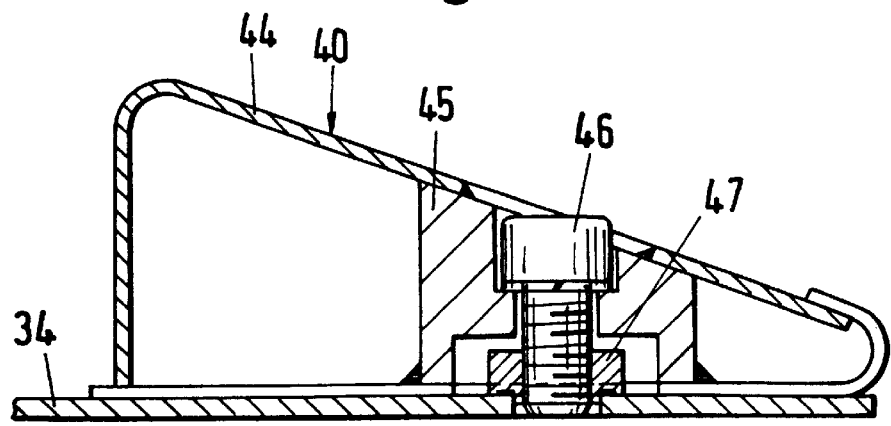

The deflector, which at the same time functions as a blocking element and prevents corncobs of the cut corn stalks, which are being transported to the chopper 10, from rolling off the cover plate 33, 34, 35, which would lead to a loss, is constructed for the example shown by a profile body, especially in the form of the hollow profile body 44 shown in FIG. 7, which can be bolted to the associated cover plate. This hollow profile body is a welded sheet-metal construction, to which a sleeve 45 is welded for bolting with the associated cover plate 33, 34, 35 to the fastening sites 41. The sleeve 45 in each case accommodates a screw 46, which is screwed with its threaded end into a threaded sleeve 47, which in turn is welded to the associated cover plate 33, 34, 35, in order to fix the respective deflector 40 at its associated cover plate.

In the case of the middle cover plate 35, two deflectors 40 are combined in mirror-symmetrical arrangement into a single deflector 40' which, as shown by FIG. 3, covers the archings 39 of the cover plates 4 and 8.

The cover plates 32 of the two outer drawing-in and cutting drums 1 and 5 are constructed differently from the remaining cover plates 33, 34 and 35. They do not have any arching 39 and, correspondingly, also no deflector 40 or similar blocking element for the latter. This follows from the different conveying relationships in the outer region of the harvesting machine, since the outer drawing-in and cutting drums 1 and 5 run in the opposite direction here to the respective inwardly adjoining drawing-in and cutting drums 2 and 6 respectively, in order, in mutual cooperation, to convey the cut harvested crops through the gap formed between them. The outer edge 38 of the outer drawing-in and cutting drums 1, 5 also leaves the front or leading part of the drawing-in and cutting drum 1, 5 uncovered; however, it intersects the dedendum circle of the driving teeth 28 already shortly before the transverse plane 50 of the machine, which is aligned orthogonally to the longitudinal median plane 9 and in which the drawing-in and cutting drums 1 to 8, which have the same diameter in the examples shown, are disposed with an aligned arrangement of their axes 20 of rotation.

What we claim is:

1. A machine moveable in a forward direction for cutting and chopping stalk-like harvested crops independently of rows, comprising a frame, a plurality of drawing-in and cutting drums rotatably mounted on the frame for rotation about substantially vertical axes, said drums each having a plurality of teeth operable to engage the crop, a cover fixedly mounted on said frame above at least one of said drums, a divider fixedly mounted on said frame and extending generally forwardly relative to said at least one drum, said cover having an outer edge with a generally rearwardly directed indented arched portion juxtaposed to the divider, said arched portion exposing the underlying teeth of the drum to thereby form an opening for entry of the harvest crop between the exposed teeth underlying said arched portion to thereby provide for cutting one type of crop, and a blocking element adapted to be disposed in a blocking position overlying said arched portion to preclude exposure of the teeth underlying said arched portion to thereby provide for cutting another type of crop.

2. A machine according to claim 1 wherein said blocking element is detachably mounted on an upper side of said cover.

3. A machine according to claim 1 wherein said blocking element is detachably mounted on a frontal edge region of said cover.

4. A machine according to claim 1 wherein said blocking element is a deflector for deflecting the harvested crop.

5. A machine according to claim 4 wherein said deflector is an elongate deflector having an elongate axis extending generally perpendicular to said forward direction.

6. A machine according to claim 4 wherein said deflector has a generally wedge-shaped configuration with the vertical height of the deflector progressively decreasing in said forward direction.

7. A machine according to claim 4 wherein said deflector includes a first wedge region disposed over the arched portion, the height of said first wedge region progressively decreasing in a forward direction, said deflector being an elongate deflector having longitudinal ends, the elongate axis of said deflector extending generally perpendicular to said forward direction, said deflector having a second wedge region on one of said longitudinal ends and displaced from overlying the arched portion of the cover, the second wedge region progressively decreasing in height as the one longitudinal end is approached.

8. A machine according to claim 1 wherein said divider point has a cross sectional configuration with tapered lower side parts.

9. A machine according to claim 8 wherein divider point has a lower end, said tapered lower side parts progressively approaching one another as said lower end is approached.

10. A machine according to claim 1 wherein said arched portion has an arcuate configuration.

11. A machine according to claim 1 wherein said arched portion has a concave configuration when viewed from above.

12. A machine according to claim 11 wherein said cover has a forward convex edge portion when viewed from above, said forward convex edge portion being juxtaposed to said arched portion.

13. A machine according to claim 12 wherein said blocking element has a forward edge which is disposed generally perpendicular to said forward direction, said forward edge being disposed generally tangentially to said forward convex edge portion of said cover.

14. A machine according to claim 1 wherein said at least one drum when viewed from above has a frontal section facing the crop to be cut, said frontal section having an upstream side and a downstream side considered in the direction of rotation of said drum, said arched portion being disposed juxtaposed to said upstream side.

15. A machine according to claim 14 wherein said divider is disposed at said upstream side of said frontal section.

16. A machine according to claim 15 further comprising another divider disposed at the downstream side of said frontal section.

17. A machine moveable in a forward direction for cutting different types of crops comprising a frame, a plurality of drawing-in and cutting drums rotatably mounted on the frame for rotation about substantially vertical axes, said drums each having a plurality of teeth operable to engage the crop, a cover in superimposed relationship with at least one of said drums, a divider fixedly mounted on said frame and extending generally forwardly relative to said at least one drum, said cover having an outer edge with a generally rearwardly directed indented arched portion juxtaposed to the divider, said arched portion exposing the teeth of the drum to thereby form an opening for entry of the crop between said exposed teeth to thereby provide for cutting one type of crop, and a blocking element adapted to be disposed in a blocking position to block exposure of said teeth and to block the opening between said teeth to thereby provide for cutting another type of crop.

18. A method for cutting and cutting different types of harvested crops comprising:

providing a forwardly moveable machine having a plurality of rotatable drawing-in and cutting drums having teeth operable to engage the crop;

disposing a cover in a position overlying at least some of said plurality of drums in which the cover has an outer edge with a generally rearwardly directed indented arched portion which exposes the teeth of the drum;

cutting one type of crop utilizing said arched portion for entry of said one type of crop into the space between the teeth underlying the arched portion;

disposing a blocking element to overlie said arched portion to preclude entry of another type of crop between the teeth underlying said arched portion; and cutting said other type of crop with said blocking element overlying said arched portion to preclude said other type of crop from being engaged by the teeth underlying the arched portion.

19. A method according to claim 18 further comprising cutting said one type of crop and said other type of crop independently of rows of crops.

20. A method according to claim 18 further comprising deflecting said crop toward the space between the teeth underlying the arched portion when cutting said one type of crop.

* * * * *